United States Patent
Larin

(10) Patent No.: US 10,907,727 B2
(45) Date of Patent: Feb. 2, 2021

(54) GEAR SELECTION SYSTEM AND METHOD

(71) Applicant: Arrival Limited, Oxfordshire (GB)

(72) Inventor: Aleksey Larin, Moscow (RU)

(73) Assignee: Arrival Limited

( * ) Notice: Subject to any disclaimer, the term of this patent is extended or adjusted under 35 U.S.C. 154(b) by 0 days.

(21) Appl. No.: 16/343,489

(22) PCT Filed: Oct. 24, 2017

(86) PCT No.: PCT/EP2017/077108
§ 371 (c)(1),
(2) Date: Apr. 19, 2019

(87) PCT Pub. No.: WO2018/086868
PCT Pub. Date: May 17, 2018

(65) Prior Publication Data
US 2019/0255949 A1    Aug. 22, 2019

(30) Foreign Application Priority Data

Nov. 9, 2016   (RU) ................................ 2016144073

(51) Int. Cl.
*F16H 59/08*     (2006.01)
*B60K 37/00*     (2006.01)
*B60K 37/06*     (2006.01)
*F16H 63/42*     (2006.01)

(52) U.S. Cl.
CPC ............. *F16H 59/08* (2013.01); *B60K 37/06* (2013.01); *B60K 2370/11* (2019.05);
(Continued)

(58) Field of Classification Search
CPC .............. F16H 59/08; F16H 2063/423; B60K 2370/11; B60K 2370/1464;
(Continued)

(56) References Cited

U.S. PATENT DOCUMENTS

2009/0174533 A1*  7/2009  Bowden ................. B60K 37/02
                                              340/425.5
2012/0041655 A1    2/2012  Thooris
(Continued)

FOREIGN PATENT DOCUMENTS

CN      103836173 A      6/2014
DE      102010005483 A1  8/2010
(Continued)

OTHER PUBLICATIONS

Machine translation of JP2003139229 filed Jul. 1, 2020 (Year: 2020).*
(Continued)

*Primary Examiner* — Tisha D Lewis
(74) *Attorney, Agent, or Firm* — Burns & Levinson, LLP; Joseph M. Maraia

(57) ABSTRACT

Provided are a gear selection system for a vehicle, and a method of selecting a gear in a vehicle, wherein a touch-sensitive user input device is configured for receiving user input in the form of user touch gestures, a display screen is configured for displaying a gear selection Graphical User Interface, and a control apparatus is configured to control the display screen to display the gear selection GUI. A control signal indicative of a selected gear is generated by the gear selection system in response to a drag gesture being received on the touch-sensitive user input device.

15 Claims, 6 Drawing Sheets

(52) U.S. Cl.
CPC ............................ *B60K 2370/146* (2019.05); *B60K 2370/1438* (2019.05); *B60K 2370/1464* (2019.05); *B60K 2370/1468* (2019.05); *F16H 2063/423* (2013.01)

(58) Field of Classification Search
CPC ...... B60K 2370/146; B60K 2370/1468; B60K 2370/1438; B60K 2370/1476; B60K 37/06
See application file for complete search history.

(56) References Cited

U.S. PATENT DOCUMENTS

| | | | |
|---|---|---|---|
| 2013/0120129 A1 | 5/2013 | Tippelhofer et al. | |
| 2014/0149909 A1 | 5/2014 | Montes | |
| 2014/0318295 A1 | 10/2014 | Kim et al. | |
| 2016/0132113 A1* | 5/2016 | Hotchkiss | G06F 3/0488 345/173 |
| 2017/0293370 A1* | 10/2017 | Hanaoka | B60K 37/02 |

FOREIGN PATENT DOCUMENTS

| | | | |
|---|---|---|---|
| EP | 3018562 A1 | 5/2016 | |
| EP | 3400518 A1 | 11/2018 | |
| JP | 2003139229 A * | 5/2003 | ............ B60K 37/06 |
| JP | 2006-177401 A | 7/2006 | |
| WO | 2015067266 A1 | 5/2015 | |
| WO | 2017118511 A1 | 7/2017 | |
| WO | 2017125200 A1 | 7/2017 | |

OTHER PUBLICATIONS

Machine translation of JP2006177401 filed Jul. 1, 2020 (Year: 2020).*
International Search Report and Written Opinion from related PCT Application No. PCT/EP2017/077108, dated Apr. 6, 2018.
English translation of Chinese Office Action dated Mar. 30, 2020 for corresponding Chinese Application No. 201780068438.5.
Examination Report dated Sep. 22, 2020, for related Application No. 17788219.8.

* cited by examiner

GEAR SELECTION SYSTEM AND METHOD

CROSS REFERENCE TO RELATED APPLICATIONS

This is a National Stage Application, filed under 35 U.S.C. 371, of International Patent Application No. PCT/EP2017/077108, filed on Oct. 24, 2017, which claims priority to Russian Application No. 2016144073 filed on Nov. 9, 2016, contents of both of which are incorporated herein by reference in their entireties.

FIELD

The present invention relates to a gear selection system and method. More particularly, the present invention relates to gear selection system that includes displaying a gear selection Graphical User Interface (GUI) for selecting a gear.

BACKGROUND

It known to display a currently selected gear on a centre console or in an instrument cluster in a vehicle. In some vehicles, the gear can be selected using a touch screen. However, according to prior art methods, a screen to change the gear is displayed either continuously or when the user presses the brake. Displaying the gear selection screen continuously is unnecessary and takes up useful space on the centre console, whereas overlaying the selected gear when the user presses the brake could result in the gear selection screen being displayed unintentionally, for example when the user stops at a stop light and has no intention of changing gear.

Moreover, present methods of selecting a gear using touch screens require the user to accurately press the chosen gear representation on the centre console. For example, when wishing to enter "Drive", the user is required to tap "D" on the centre console. This can be particularly challenging as centre consoles tend to be small so it can be easy to accidentally select the wrong gear, and it is difficult to maintain awareness of surroundings and look at a display screen.

Aspects of the present invention aim to address one or more drawbacks inherent in prior art methods and apparatuses for changing gear.

SUMMARY

According to a first aspect of the present invention there is provided a gear selection system for a vehicle, comprising a display screen for displaying a gear selection Graphical User Interface (GUI), a user input device for receiving user input in the form of a first user gesture, and a control apparatus configured to control the display screen to display the gear selection GUI in response to the first user gesture being received.

The gear selection system may be configured to control the vehicle to change the currently selected gear in response to a second user gesture being received.

The user input device may comprise a touch-sensitive interface, and the first user gesture may comprise a touch event received on the touch-sensitive interface, and the second user gesture may comprise a drag event received on the touch-sensitive interface.

In another aspect of the present invention, there is provided a gear selection system for a vehicle, comprising a touch-sensitive user input device configured for receiving user input in the form of user touch gestures, a display screen for displaying a gear selection Graphical User Interface (GUI), and a control apparatus configured to control the display screen to display the gear selection GUI, wherein the gear selection system is configured to generate a control signal indicative of a selected gear in response to a drag gesture being received on the touch-sensitive user input device.

The display screen and the user input device may be embodied together as a touch-sensitive display screen.

The control apparatus may be configured to change the gear selection GUI in response to the drag gesture being received on the user input device, to indicate a selected gear.

The gear selection system may further comprise an instrument cluster display, and the control apparatus may be configured to control the instrument cluster display to indicate a currently selected gear.

The control apparatus may be configured to display an image on the instrument cluster display corresponding to the gear selection GUI displayed on the touch-sensitive display screen.

The control apparatus may be configured to control the display screen to display the gear selection GUI in response to a first user gesture being received on the touch-sensitive user input device before the drag gesture is received.

The first user gesture may comprise a touch gesture.

The control apparatus may be configured to control the display screen to display the gear selection GUI in response to the first user gesture being received only if a predefined vehicle condition is satisfied.

The control apparatus may be configured to determine that the predefined vehicle condition is satisfied if the vehicle is travelling below a threshold speed and/or if a vehicle brake is activated.

The gear selection system may further comprise a user feedback apparatus configured to provide user feedback if the currently selected gear is changed.

The user feedback apparatus may be configured to generate the user feedback in the form of audio and/or haptic feedback. The user feedback may comprise a vibration generated through the touch-sensitive user input device.

The gear selection system may further comprise an automatic transmission and an actuator operable to change gear of the automatic transmission in response to the control signal received from the control apparatus or in response to the second user gesture being received.

A yet further aspect of the present invention provides a vehicle comprising the gear selection system described above.

The vehicle may further comprise a speed sensing apparatus configured to send a signal indicating a current vehicle speed to the control apparatus, and the control apparatus may be configured to determine whether the current vehicle speed satisfies the predefined vehicle condition.

The vehicle may comprise at least one brake sensing apparatus configured to send a signal indicating a current vehicle braking condition to the control apparatus, and the at least one control apparatus may be configured to determine whether the current vehicle braking condition satisfies the predefined vehicle condition.

A yet further aspect of the present invention provides a method of selecting a gear in a vehicle comprising receiving a first user gesture, and controlling a display screen to display a gear selection GUI indicating a currently selected gear in response to the first user gesture being detected.

The method may comprise receiving an indication of a current vehicle condition, determining whether the current vehicle condition satisfies a predefined vehicle condition, and controlling the display screen to display the gear selection GUI in response to the first user gesture being received only if the current vehicle condition satisfies the predefined vehicle condition.

The current vehicle condition may comprise a current vehicle speed received from at least one vehicle speed sensing apparatus, and a vehicle speed element of the predefined vehicle condition may be satisfied if the vehicle is travelling below a threshold speed.

The current vehicle condition may comprises a current vehicle braking condition received from at least one vehicle brake sensing apparatus, and a vehicle braking element of the predefined vehicle condition may be satisfied if the current vehicle braking condition indicates that a vehicle brake is activated.

The method may further comprise controlling the vehicle to change the currently selected gear in response to a second user gesture being detected.

The first user gesture may comprise a touch event received on a touch-sensitive interface, and the second user gesture may comprise a drag event received on the touch-sensitive interface.

The method may further comprise providing user feedback if the currently selected gear is changed. The method may comprise providing the user feedback in the form of audio and/or haptic feedback.

A yet further aspect of the present invention provides a method comprising displaying a gear selection GUI on a display screen, receiving a drag gesture on a touch-sensitive user input device, generating a control signal indicative of a selected gear in response to the drag gesture received on the touch-sensitive user input device.

The display screen and the user input device may be embodied together as a touch-sensitive display screen, and the drag gesture may be received on the touch-sensitive display screen.

The gear selection GUI may be changed in response to the drag gesture being received on the user input device, to indicate a selected gear.

The method may further comprise displaying a currently selected gear on an instrument cluster display.

The method may comprise displaying an image on the instrument cluster display corresponding to the gear selection GUI displayed on the touch-sensitive display screen.

The method may comprise controlling the display screen to display the gear selection GUI in response to a first user gesture being received on the touch-sensitive user input device before the drag gesture is received.

Receiving the first user gesture may comprise receiving a touch gesture on the touch-sensitive user input device.

The method may comprise controlling the display screen to display the gear selection GUI in response to the first user gesture being received only if a predefined vehicle condition is satisfied.

The method may comprise determining that the predefined vehicle condition is satisfied if the vehicle is travelling below a threshold speed and/or if a vehicle brake is activated.

The method may further comprise providing user feedback if the currently selected gear is changed. The method may comprise generating the user feedback in the form of audio and/or haptic feedback. The method may comprise generating vibration through the touch-sensitive user input device as the user feedback.

The method may further comprise operating an actuator to change a gear of an automatic transmission in response to the control signal received from the control apparatus.

The method may further sending a signal indicating a current vehicle speed from a speed sensing apparatus, and determining whether the current vehicle speed satisfies the predefined vehicle condition.

The method may comprise sending a signal indicating a current vehicle braking condition from at least one brake sensing apparatus, and determining whether the current vehicle braking condition satisfies the predefined vehicle condition.

A yet further aspect of the present invention provides a computer-readable storage medium arranged to store computer program instructions which, when executed, perform the method described above.

A yet further aspect of the present invention provides an apparatus comprising at least one computer processor, and at least one computer memory containing computer executable instructions which, when executed by the at least one computer processor, cause the method described above.

The apparatus may further comprise any of the features of the gear selection system described above.

All features described herein (including any accompanying claims, abstract and drawings), and/or all of the steps of any method or process so disclosed, may be combined with any of the above aspects in any combination, except combinations where at least some of such features and/or steps are mutually exclusive.

BRIEF DESCRIPTION OF THE FIGURES

Embodiments of the present invention will now be described, by way of example only, with reference to the accompanying drawings, in which.

DETAILED DESCRIPTION

Figure 1A:
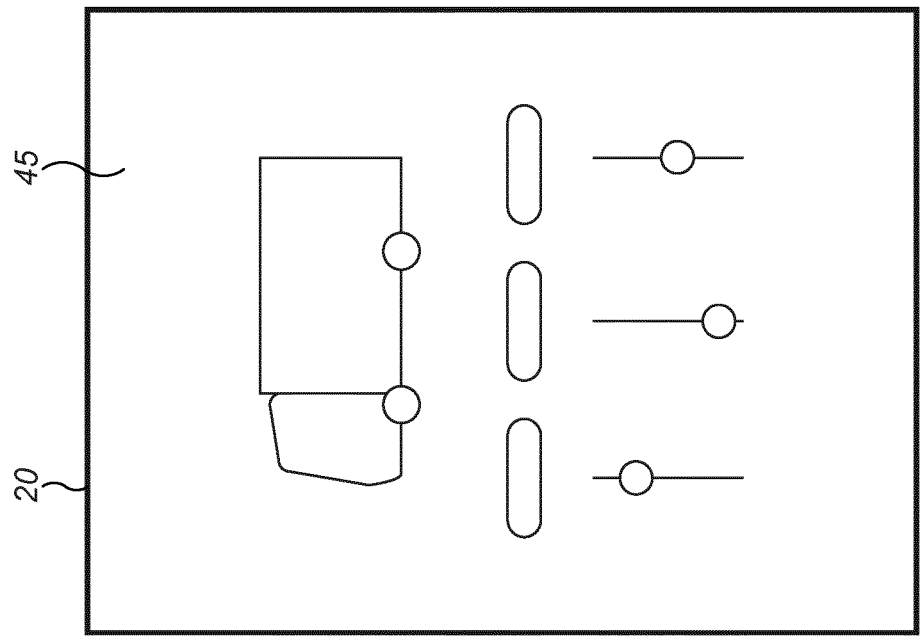
FIGS. 1a to 1c shows a gear selection system according to an aspect of the present invention.
Figure 1A:
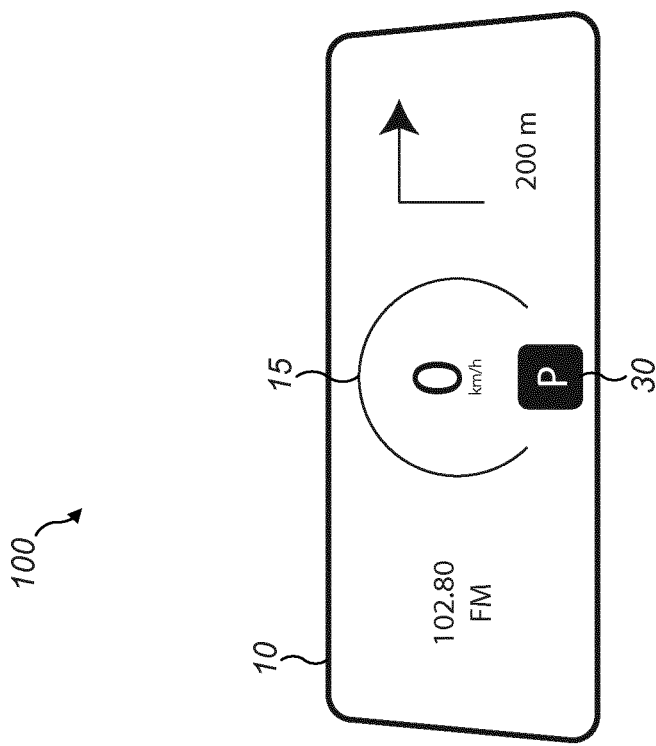

With reference to FIG. 1a, there is provided a gear selection system 100 having a centre console display 20 and an instrument cluster display 10. The gear selection apparatus may also be referred to as a gear selector.

The instrument cluster display 10 may be disposed in the conventional location, which is above and behind the vehicle's steering wheel. The instrument cluster display 10 can be used to display essential driver-awareness information that can be seen at a glance by the driver of the vehicle while keeping the road ahead in their field of view. Usually, the instrument cluster display 10 is used to display information such as the vehicle's speed 15, engine speed, oil temperature, and current gear.

In the present embodiment, the centre console display 20 is situated away from the driver's line of sight when looking straight ahead. In some embodiments, the centre console display 20 is disposed in the space in the vehicle that would traditionally be occupied by a gear stick. The centre console display 20 displays information that is less essential than the information on the instrument cluster display 10. For example, the centre console display 20 displays a vehicle control GUI 45 having settings and notifications such as tyre pressure, controls for the radio, air conditioning, or a map for navigation.

Figure 1B:
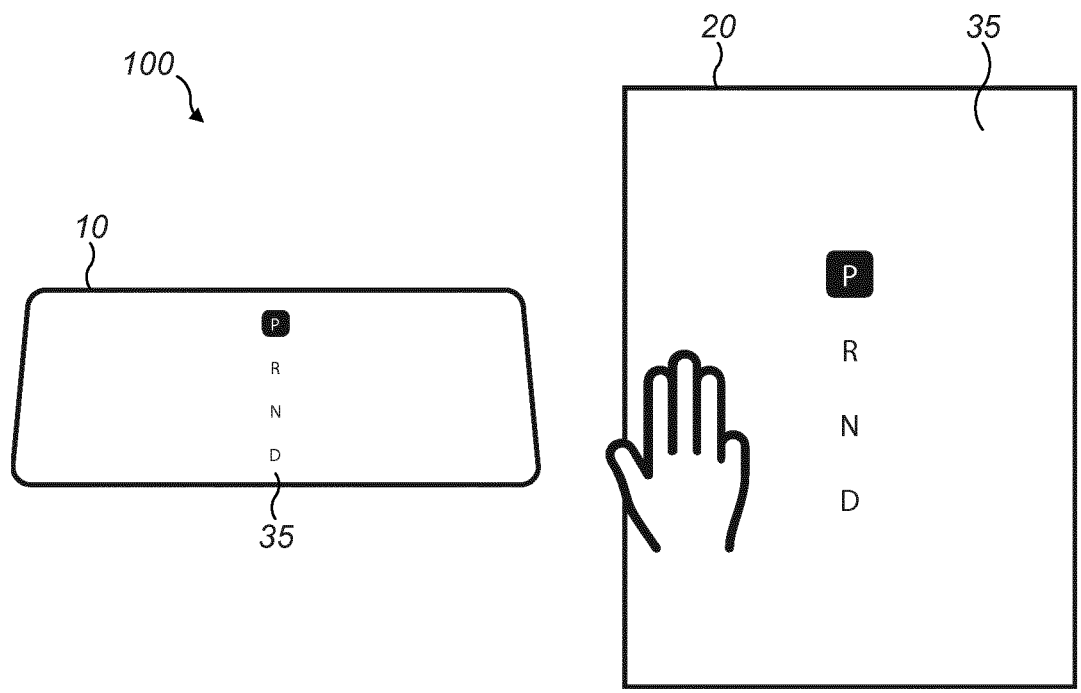
Figure 1C:
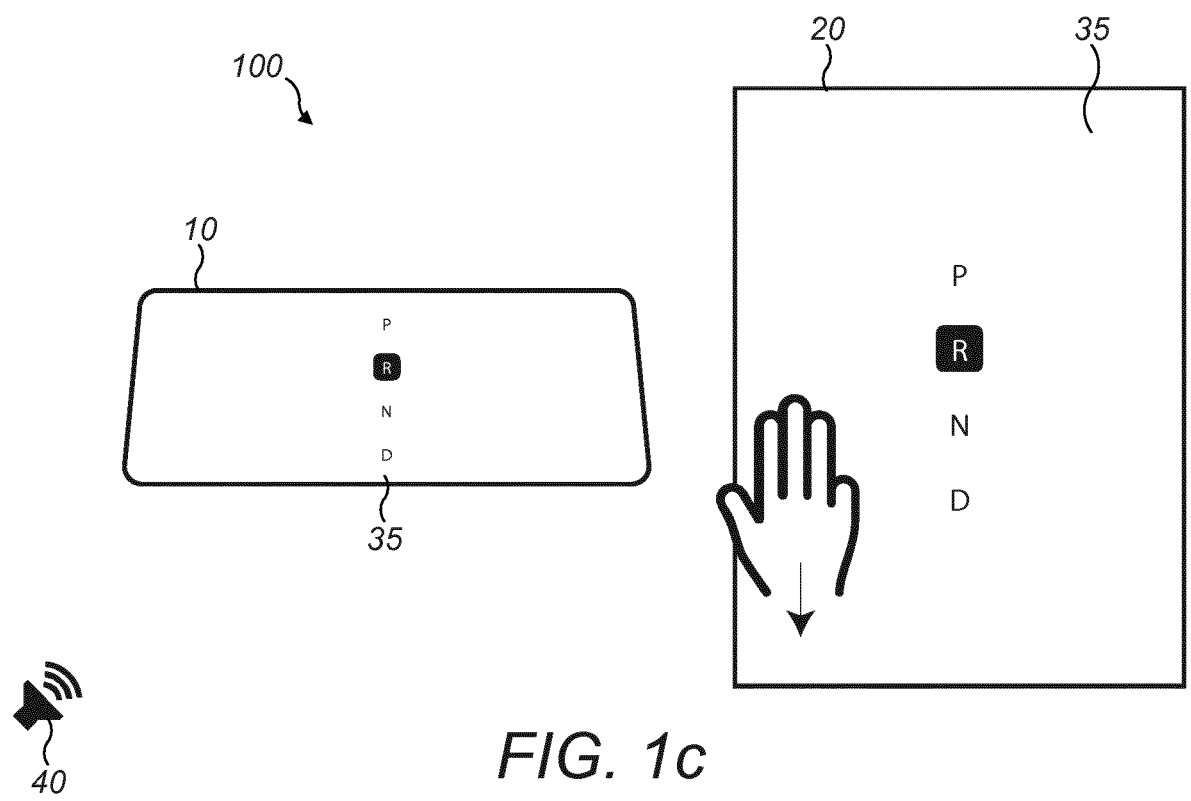

According to some embodiments of the present invention, and as described with reference to FIGS. 1b and 1c, a gear selection graphical user interface (GUI) 35 is displayed on the instrument cluster display 10 and on the centre console display 20 when a corresponding user gesture is detected. The centre console display 20 is a touch screen, and functions as a user input device or unit through which user gestures can be received and detected. The corresponding user gesture according to the embodiment shown in FIGS. 1b and 1c is a hand gesture, specifically a touch event comprising three contact points. When the user places three fingers on the centre console display 20, the gear selection GUI 35 is activated. In other words, the gear selection GUI 35 is displayed when three contact points are detected simultaneously on the centre console display 20. The user gesture in other embodiments may involve touching between one and five fingers on the centre console display 20. Furthermore, the user gesture may be a composite action comprising both touch and drag events, such as first touching the centre console display 20 with a number of fingers, removing the fingers, and then touching the centre console display 20 again with a number of fingers.

It would be readily appreciated that other user gestures may activate the gear selection GUI 35. In some embodiments, the gear selector 100 comprises an image capturing device, such as a video camera. Here, the centre console display 20 does not need to be a touch screen. Instead, the image capturing device detects the user gesture, such as a hand wave.

Figure 5:
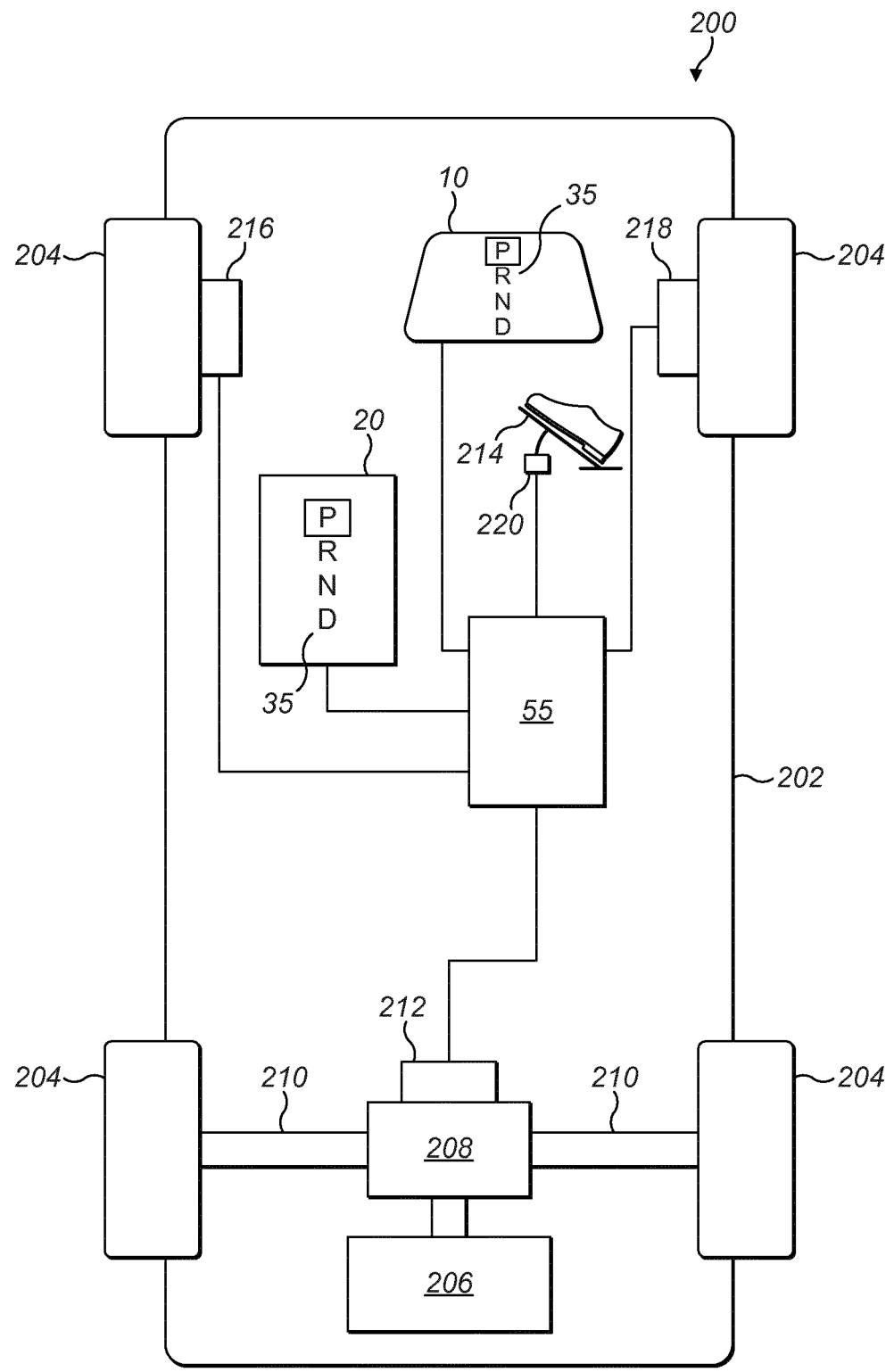
FIG. 5 shows a schematic view of a gear selection system of the present invention embodied in a vehicle.

FIG. 5 shows a schematic view of a vehicle 200 including an exemplary gear selection system 100 of the invention. The vehicle 200 comprises a chassis 202, wheels 204 and a power unit 206. The power unit 206 may comprise an internal combustion engine, an electric motor, a hybrid ICE/electric power unit, or other suitable vehicle power unit. The power unit 206 is connected to at least two wheels 204 via a transmission 208 and drive shafts 210. The transmission 208 comprises an actuator 212 operable to change the selected gear of the transmission 208. The vehicle 200 also includes a brake actuator 214, which may comprise a foot brake (as shown in FIG. 5) or alternatively, or in addition, may comprise a hand brake; a speed sensor 216; and a brake sensor, which may comprise a wheel-mounted brake sensor 218 to detect operation of the vehicle brakes, or a brake actuator sensor 220 mount to or proximate the brake actuator 214 to detect operation of the brake actuator 214.

The gear selection system 100, in the illustrated exemplary embodiment shown in FIG. 5, includes the centre console display 20, which may comprise a touch-sensitive display screen, and the instrument cluster display 10. These are illustrated in FIG. 5 as both showing the gear selection GUI 35. Also provided is a control apparatus 55. The control apparatus 55 may comprise one or more separate controllers within the scope of the invention, which may be disposed together or distributed around the vehicle 200 or gear selection system 100. The centre console display 20 and instrument cluster display 10 are connected to, and controlled by, the control apparatus 55. The control apparatus 55 is also connected to the transmission actuator 212 to control operation thereof, and is connected to the speed and brake sensors 216, 218, 220 to receive signals respectively representative of a vehicle speed and braking condition.

The control apparatus 55 may comprise one or more display controllers configured to control the centre console display 20 and the instrument cluster display 10, and/or a transmission controller configured to control the actuator 212, and/or a master controller configured to control one or more previously-mentioned controllers and/or any other controller in the system.

In some embodiments, the gear selection GUI 35 is displayed when a foot brake 214 is depressed and when the user gesture as previously described is received. The gear selection GUI 35 may be displayed when the foot brake 214 is depressed and the user gesture is simultaneously detected. Alternatively, the gear selection GUI 35 may be displayed when the user gesture is detected a predetermined amount of time after the foot brake 214 is depressed.

By only overlaying the gear selection GUI 35 over the vehicle control GUI 45 at the appropriate times (i.e. when the user makes the gesture), the man-machine interface is improved. The user is able to maintain control over vehicle settings and not become distracted by an unwanted or unintentional change of GUI. Furthermore, by changing the display on the instrument cluster display 10 to show the gear selection GUI 35 as well as or in lieu of changing the display of the centre console display 20, the user is able to maintain better awareness of their surroundings by not having to take their eyes too far off the road.

As shown in FIG. 1c, once the gear selection GUI 35 is displayed, the user is able to change the gear of the vehicle 200. The user changes the gear by dragging a number of fingers (such as one finger, two fingers or three fingers) along the centre console display 20 while the gear selection GUI 35 is displayed, in the direction of the indicator of the required gear. That is, a drag gesture may comprise sliding one or more fingers across the touch-sensitive user input device, which in an exemplary embodiment may comprise a touch-sensitive display screen or centre console display 20. The vehicle 200 may be provided with a manual transmission or an automatic transmission. For example, for a "drive" gear, the indicator of the gear is a "D" symbol; for a "reverse" gear, the indicator of the gear is an "R" symbol; for a "parking" gear, the indicator of the gear is a "P" symbol; for a "neutral" gear, the indicator of the gear is an "N" symbol; and for a "sport" gear, the indicator of the gear is an "S" symbol. The individual gears may be additionally or alternatively represented by numbers. In these embodiments, the centre console display 20 is a touch screen.

When the gear is changed, an audio device 40 emits a sound to alert the user to the gear change. Additionally, or in alternative embodiments, the gear selection apparatus 100 may be provided with a haptic feedback configured to cause the centre console display 20, or another user input means that comes in contact with the user such as the steering wheel, to vibrate. This means the user does not need to take their eyes off the road to look at the centre console display 20 or the instrument cluster display 10 to know that a new gear has been selected.

More specifically, the gear selection GUI 35 is displayed when a first user gesture is detected, and a gear is changed (or, in other words, a new gear is selected), when a second user gesture is detected.

Figure 2:
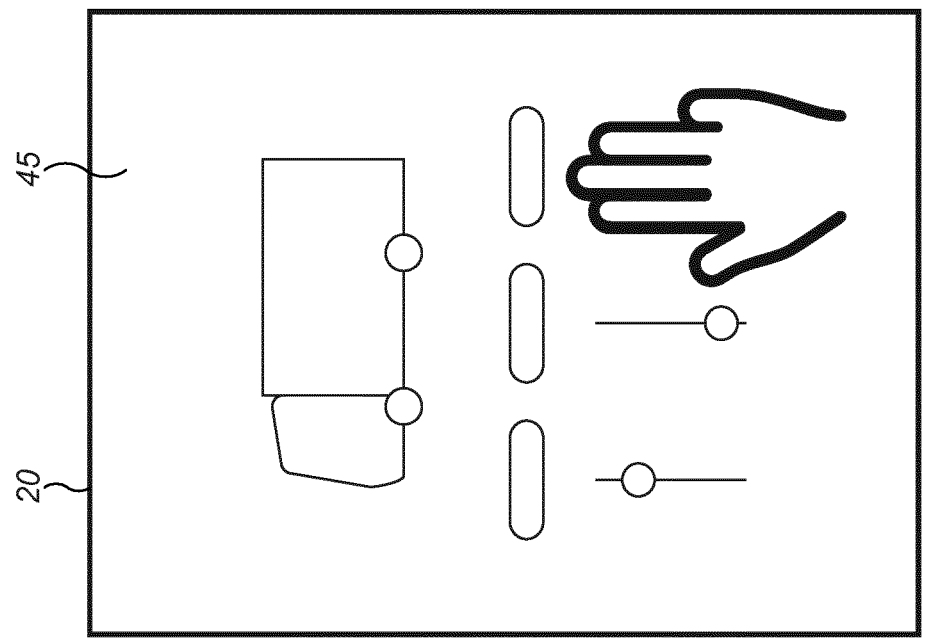
FIG. 2 shows a gear selection system according to another aspect of the present invention.
Figure 2:
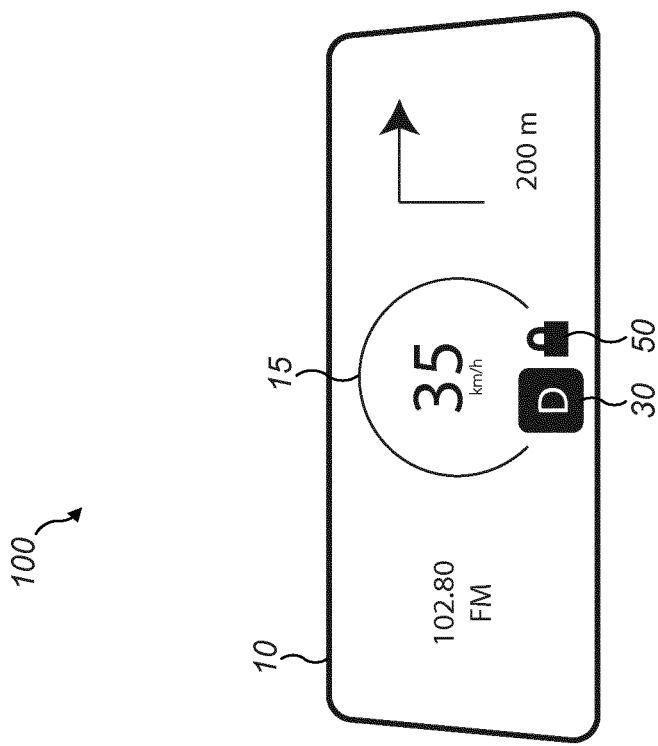

Another embodiment of a gear selection system 100 of the present invention will now be described with reference to FIG. 2. Here, when the vehicle is travelling above a threshold speed and the first user gesture is detected, the instrument cluster display 10 and the centre console display 20 are locked. In some embodiments, at least one of the centre console display 20 and instrument cluster display 10 to display a lock symbol 50 when they are locked. This prevents the vehicle from changing gear and damage being caused to the vehicle when it is travelling at high speed. Moreover, it ensures the user is not distracted by a gear selection GUI 35 when they cannot change gear or it is not appropriate to change gear.

It would be readily understood that displaying the gear indicator GUI 30 and gear selection GUI 35 on the instrument cluster display 10 is advantageous, but may not be essential when also they are displayed on the centre console display 20. In addition, it may be advantageous that the centre console display comprises a touch-sensitive display screen such that the user input device for receiving user touch gestures is also the display screen for the GUI 35. However, the invention is not limited to this particular configuration an instead a console display screen and a separate touch-sensitive user input device, such as a touch sensitive pad, may be provided.

Figure 3:
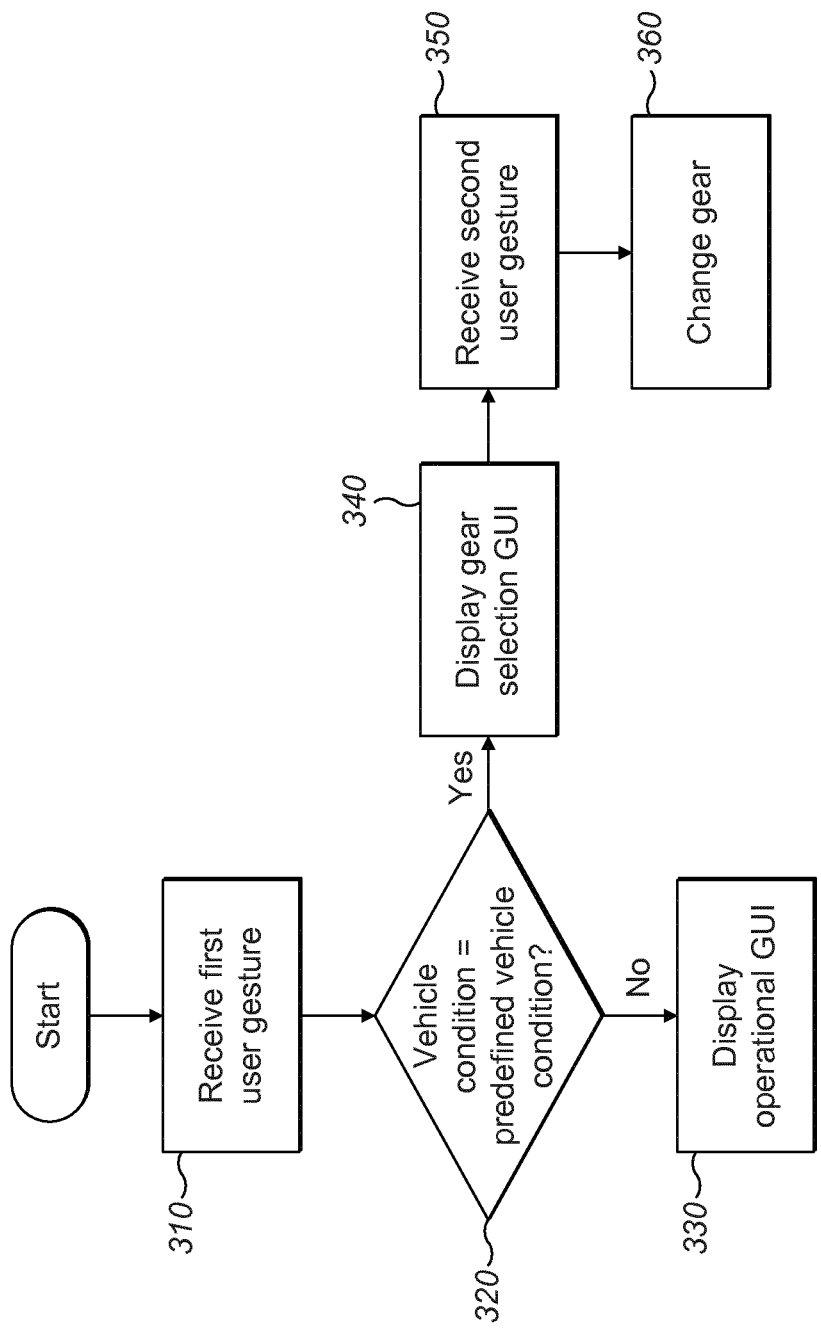
FIG. 3 shows a method of controlling the gear selection system according to an aspect of the present invention.

FIG. 3 illustrates a method of controlling a gear selection apparatus 100 according to the previously-described embodiments. In a first step 310, a first user gesture is received from user input apparatus, such as a touch screen or camera.

In step 320, the control apparatus 55 determines whether a vehicle condition matches a predefined vehicle condition. The vehicle condition is, for example, a vehicle speed or a braking condition.

If the condition is not met, for example the vehicle is not slowing down, then in step 330 an operational GUI such as the vehicle control GUI 45 continues to be displayed on at least one of the instrument cluster display 20 and centre console display 10.

If the vehicle condition does match the predefined vehicle condition, then in step 340 the gear selection GUI 35 is displayed on the instrument cluster display 10 and the centre console display 20. This allows the user to see the gear the vehicle is currently in without having to turn their attention too far from the road.

In step 350 a second user gesture is received. This may be received at the same user input apparatus as the first user gesture, or a different user input apparatus. The second user gesture is for example a sliding action on the centre console display 20.

In step 360, the gear selection apparatus 100 changes the gear of the vehicle according to the second user gesture.

Figure 4:
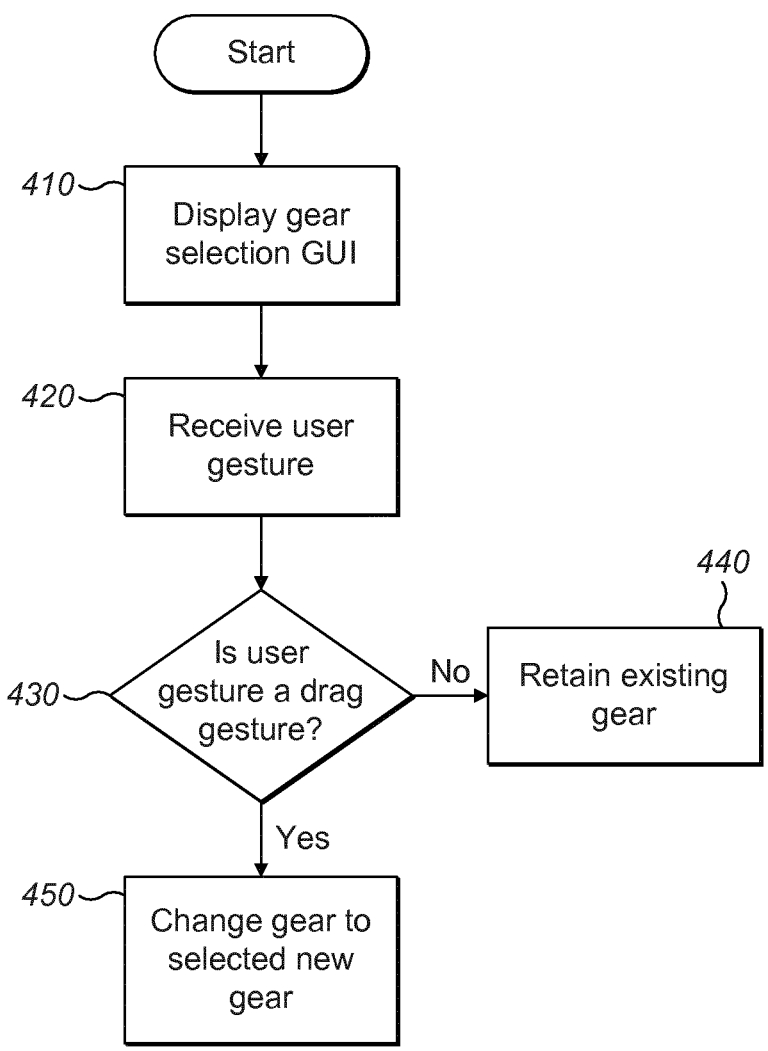
FIG. 4 shows a method of controlling the gear selection system according to another aspect of the present invention.

FIG. 4 illustrates a method of controlling a gear selection apparatus 100 according to another embodiment of the invention. In a first step 410, the gear selection GUI 35 is displayed on the centre console display 20. Advantageously, the gear selection GUI 35 is also displayed on the instrument cluster display 10 which may allow the user to see the gear the vehicle is currently in without having to turn their attention too far from the road.

In step 420, a user gesture is received by the touch-sensitive user input device or centre console display 20.

In step 430, the control apparatus 55 determines whether the received user gesture comprises a drag gesture.

If the received gesture does not comprise a drag gesture, then in step 440 the existing gear is maintained. In other words, the control apparatus 55 does not control the actuator 212 to change gear in the transmission 208. This prevents accidental changing of gear if an incorrect gesture is detected, such as a user accidentally touching the centre console display 20 without meaning to change gear.

If the received gesture does comprise a drag gesture, then in step 450 the control apparatus 55 controls the actuator 212 to change gear in the transmission 208 according to the gear selected by the user. This means that only a deliberate, drag gesture causes the gear selection system of effect a gear change.

Within the scope of the invention, before step 410, the system 100 may make the determination as to whether a vehicle condition matches a predefined vehicle condition to determine whether a gear selection GUI should be displayed, as with steps 320, 330 described with reference to FIG. 3.

Also, the gear selection system 100 may omit the determination step 430 and step 420 may comprise receiving a user drag gesture, and the method may proceed directly to step 450 to effect the change of gear in accordance with the received drag gesture.

An advantage of an embodiment of the invention of selecting a gear by means of a drag gesture advantageously mimics gear-changing bodily movement of conventional and widely-familiar gear shifters in known vehicles, and so provides enhanced user-experience and acceptance. The general drag movement on a touch-sensitive interface also avoids the need for a user to press a specific button or icon, meaning the gear changing action may be performed without diverting attention from the road ahead. This is further enhanced with optionally providing an indication of a current and newly-selected gear on a display, which may be a console or an instrument cluster display.

In an advantageous embodiment, a touch event to activate the gear selection GUI 35 may comprise a user placing a given number of fingers (for example, three fingers) on the centre console display 20. The gear selection GUI 35 may be displayed when the given contact points are detected simultaneously on the centre console display 20. Then, once the gear selection GUI 35 is displayed, the user may change the gear by dragging the same given number of fingers along the centre console display 20 while the gear selection GUI 35 is displayed, in the direction of the indicator of the required gear.

Advantageously, if a different number of fingers are placed on the centre console display 20 (for example, only two fingers), the gear selection GUI 35 may not be displayed. Yet further, if the given number of fingers (for example, three) are placed on the centre console display 20, but a different of fingers (for example, only two) are dragged along the centre console display 20, the gear may not be changed, or the gear selection GUI 35 may cease to be displayed.

Embodiments of the present disclosure may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present disclosure, the computer program according to any of the above aspects, may be implemented in a computer program product comprising a tangible computer-readable medium bearing computer program code embodied therein which can be used with a processor for the implementation of the functions described above.

Reference to "computer-readable storage medium", "computer program product", "tangibly embodied computer program" etc., or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

By way of example, and not limitation, such "computer-readable storage medium" may mean a non-transitory computer-readable storage medium which may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. An exemplary non-transitory computer-readable storage medium is an optical storage disk such as a CD. Also, any connection is properly termed a "computer-readable medium". For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that "computer-readable storage medium" and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of "computer-readable medium".

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

If desired, the different steps discussed herein may be performed in a different order and/or concurrently with each other. Furthermore, if desired, one or more of the above-described steps may be optional or may be combined.

Advantages of the present invention reside in the detection of a user gesture for activating a gear selection GUI 35. This prevents the gear selection GUI 35 being overlaid on the centre console display 20 and or the instrument cluster display 10 unnecessarily.

Whilst certain embodiments of the invention have been described herein with reference to the drawings, it will be understood that many variations and modifications will be possible without departing from the scope of the invention as defined in the accompanying claims.

What is claimed is:

1. A gear selection system for a vehicle, comprising:
   a touch-sensitive user input device configured for receiving user input in the form of user touch gestures;
   a display screen for displaying a gear selection Graphical User Interface (GUI);
   a control apparatus configured to:
   control the display screen to display the gear selection GUI in response to a first user gesture being received on the user input device, the first user gesture comprising a user placing a given number of at least two fingers on the touch-sensitive user input device; and
   change the gear selection GUI in response to a drag gesture being received on the user input device, the drag gesture comprising the user dragging the same given number of fingers on the touch-sensitive user input device to indicate a selected gear while the gear selection GUI is displayed,
   wherein the gear selection system is configured to generate a control signal indicative of the selected gear in response to the drag gesture.

2. The gear selection system according to claim 1, wherein the display screen and the user input device are embodied together as a touch-sensitive display screen.

3. The gear selection system according to claim 1, further comprising an instrument cluster display, wherein the control apparatus is configured to control the instrument cluster display to indicate a currently selected gear.

4. The gear selection system according to claim 3, wherein the control apparatus is configured to display an image on the instrument cluster display corresponding to the gear selection GUI displayed on a touch-sensitive display screen.

5. The gear selection system according to claim 1, wherein the control apparatus is configured to control the display screen to display the gear selection GUI in response to the first user gesture being received only if a predefined vehicle condition is satisfied.

6. The gear selection system according to claim 5, wherein the control apparatus is configured to determine that the predefined vehicle condition is satisfied if the vehicle is travelling below a threshold speed and/or if a vehicle brake is activated.

7. The gear selection system according to 1, further comprising a user feedback apparatus configured to provide user feedback, in the form of audio and/or haptic feedback, if the currently selected gear is changed.

8. The gear selection system according to claim 1, further comprising an automatic transmission and an actuator operable to change gear of the automatic transmission in response to the control signal received from the control apparatus.

9. A method of selecting a gear in a vehicle comprising:
   receiving a first user gesture by a touch-sensitive interface, the first user gesture comprising a user placing a given number of at least two fingers on the touch-sensitive interface;

controlling a display screen to display a gear selection GUI indicating a currently selected gear in response to the first user gesture; and receiving a second user gesture by the touch-sensitive interface, the second user gesture comprising the user dragging the same given number of fingers on the touch-sensitive interface to indicate a selected gear while the gear selection GUI is displayed;

controlling the vehicle to change the currently selected gear to the selected gear in response to the second user gesture.

10. The method according to claim 9, further comprising:
receiving an indication of a current vehicle condition;
determining whether the current vehicle condition satisfies a predefined vehicle condition; and
controlling the display screen to display the gear selection GUI in response to the first user gesture being received only if the current vehicle condition satisfies the predefined vehicle condition.

11. The method according to claim 10, wherein:
the current vehicle condition comprises a current vehicle speed received from at least one vehicle speed sensing apparatus; and
the predefined vehicle condition is satisfied if the vehicle is travelling below a threshold speed.

12. The method according to claim 10, wherein:
the current vehicle condition comprises a current vehicle braking condition received from at least one vehicle brake sensing apparatus; and
a vehicle braking element of the predefined vehicle condition is satisfied if the current vehicle braking condition indicates that a vehicle brake is activated.

13. The method according to claim 9, further comprising:
providing user feedback, in the form of audio and/or haptic feedback, if the currently selected gear is changed.

14. A computer-readable storage medium arranged to store computer program instructions which, when executed, perform the method according to claim 9.

15. An apparatus comprising:
at least one computer processor; and
at least one computer memory containing computer executable instructions which, when executed by the at least one computer processor, cause the method of claim 9.

* * * * *